United States Patent Office 3,359,153
Patented Dec. 19, 1967

3,359,153
LIGHT STABILIZED LAMINATED ARTICLES
Claude Thomas Bean, Jr., Niagara Falls, N.Y., assignor to Hooker Chemical Corporation, Niagara Falls, N.Y., a corporation of New York
No Drawing. Filed Mar. 2, 1964, Ser. No. 348,801
7 Claims. (Cl. 161—189)

ABSTRACT OF THE DISCLOSURE

A laminated plastic article comprises (a) a core material comprised of an unsaturated polyester resin and vinylidine monomer, (b) an outer surface of polyvinyl fluoride, and (c) an intermediate layer comprised of a major proportion of an unsaturated polyester and vinylidine monomer and a minor proportion of an ultraviolet light stabilizer, said intermediate layer being between and permanently bonded to the core and the outer surface. Such plastic articles have superior light stability and weathering properties.

---

This invention relates to laminated materials or articles and in particular to plastic materials having improved light stability and weathering properties.

Resinous articles comprising an unsaturated polyester resin and a vinylidine monomer may be subject to deterioration and to discoloration when exposed to natural outdoor conditions for prolonged periods of time. This is especially true of the resinous articles based on halogen containing polyester resins, which are preferred compositions employed in the present invention. This deterioration and discoloration is in part due to the presence of ultraviolet light and the sun's radiation and in part due to temperature, humidity and other climatic conditions. Methods have been proposed for diminishing the effects of weather by incorporating in the resinous articles an ultraviolet light absorbing material. These methods are quite costly and do not offer sufficient protection to the surface of the resinous article for many applications. In the weathering of such products it has been observed that the degradation occurs on the surface of the finished polyester article, the remainder being unaffected. This discoloration always occurs after a longer period of time than would be the case if no ultraviolet light absorbing material were present. Discoloration may then be removed from the surface by various methods, such as by sanding off and polishing, but if the material is re-exposed, the discoloration will reappear in the same period of time as it took for the original discoloration to appear. In order to overcome this, methods have been suggested whereby the ultraviolet light absorbing material is concentrated on the surface of the resinous article, such as by painting, spraying, or otherwise applying a coating containing the ultraviolet light absorbing material. These methods suffer from the serious disadvantage that the operation must be conducted on the finished resinous articles. It is not usually practicable to apply conventional coatings in a plant where the resinous article is fabricated. In addition to this, the conventional coating methods frequently do not provide sufficient adherence of the coating compositions to the resinous articles.

There has now been found an unique structure for laminated or stratified plastic articles which gives them light stability and weathering properties which are superior to prior art products. In accordance with this invention there is provided a laminated or stratified plastic article comprising (a) a core material comprised of an unsaturated polyester resin and a vinylidine monomer, (b) an outer surface of polyvinyl fluoride, and (c) an intermediate layer comprised of a major proportion of an unsaturated polyester resin and a vinylidine monomer and a minor proportion of an ultraviolet light stabilizer, said intermediate layer being between and permanently bonded to said core and said outer surface.

The intermediate layer composition (described below) is generally prepared by admixing the ingredients in the desired proportions. After the addition of polymerization initiator the intermediate layer of composition is spread out upon a film of polyvinyl fluoride and allowed to gel. The intermediate layer can be spread out to the desired thickness by any suitable means, such as a roller, doctor blade, brush, spray gun or by other appropriate means and methods. Thicknesses from about 0.1 to about 25 mils are generally preferred. The intermediate layer composition is then allowed to gel; this is preferably done by allowing the intermediate layer composition to stand open to the atmosphere, although heating may be used to speed the gelation. Gelation time will vary depending upon the thickness of the film desired and the ingredients employed. Generally, however, from one to sixty minutes is required. After gelation, the gelled side of the coated polyvinyl fluoride film is contacted with the core which is a copolymerizable composition comprising an unsaturated polyester resin with a vinylidine monomer. A coated resinous laminated article is then cured, preferably at elevated temperature.

The plastic laminated article prepared by the above method has many advantages over prior art materials. The light absorbing material is concentrated nearer the surface of the laminated article. The intermediate layer is chemically combined with the core and outer surfaces, thus providing an extremely adherent structure. The present invention provides more stability against the deleterious effects of weathering than the products and methods of the prior art.

The resinous article, i.e., core, to be protected by the method of the present invention is a copolymerized composition comprising (a) an unsaturated polyester resin which is the reaction product of polybasic acid and a polyhydric alcohol and (B) a vinylidine monomer. In the preparation of the unsaturated polyester resins in the present invention one should use an alpha,beta-unsaturated polybasic acid, such as maleic, fumaric, aconitic, itaconic acid, and the like. These unsaturated acids should be present to the extent of at least twenty percent by weight of the total polybasic acid and preferably should be between about twenty-five and sixty-five percent by weight of the total weight of the polybasic acid. In addition, saturated polybasic acids may be used, that is, those which are free of non-benzenoid unsaturation. The preferred saturated polybasic acids of the present invention are those which are Diels-Alder adducts of hexachlorocyclopentadiene, for example, 1,4,5,6,7,7-hexachlorobicyclo-(2.2.1) - 5 - heptene-2,3-dicarboxylic acid, 1,4,5,6-tetrachloro-7,7-difluorobicyclo-(2.2.1)-5-heptene - 2,3 - dicarboxylic acid, and others. Other saturated polybasic acids which may be employed include phthalic, tetrachlorophthalic, oxalic, malonic, succinic, glutaric, sebacic, isosebacic and adipic acids and so forth. Mixtures of polybasic acids may also be used. The anhydrides of the above acids may also be used.

It is preferred to employ polyhydric alcohols having only two hydroxy groups, although minor amounts of alcohol having three or more hydroxy groups may also be used. Among the dihydroxy alcohols which may be used are ethylene glycol, 1,2-propylene glycol, 1,3-propylene glycol, diethylene glycol, dipropylene glycol, 1,4-butanediol, 1,3-butanediol, 1,2-pentanediol, 1,3-pentanediol, 1,4-pentanediol, 1,6-hexanediol, neopentyl glycol and the like. Among the other polyhydroxy alcohols which may be employed are glycerol, hexanetriol, butanetriol, dimethylol propane, trimethylolethane, pentaerythritol, dipentaerythritol, and so forth. Mixtures of polyhydric alcohols may also be used. Additionally, a polyhydric alcohol may be employed which is a Diels-Alder adduct of hexachlorocyclopentadiene, such as 2,3-dimethylol-1,4,5,6,7,7-hexachloro-(2.2.1)-5-heptene and so forth.

The ratio of polybasic acid to polyhydric alcohol may be expressed as a carboxyl-hydroxyl ratio, and may vary over a range such as 0.5:1 to 1.2:1. Generally, however, a hydroxyl-carboxyl ratio of at least one is preferred. The ratio of unsaturated liquid polyester of the intermediate layer employed will vary depending upon other ingredients employed in the viscosity of the intermediate layer composition desired.

Any vinylidine monomer may be employed, that is, any compound containing a $CH_2=C<$ group, capable of copolymerization with fumarate and maleate unsaturation. For example, styrene, vinyltoluene, divinyl compounds such as divinylbenzene, polyallyl compounds such as diallylphthalate, diallylmaleate, triallylphosphate, diallyl 1,4,5,6,7,7 - hexachlorobicyclo - (2.2.1) - 5 - heptene - 2,3-dicarboxylate. The proportion of monomers to unsaturated polyester resins may be varied over a wide range, depending on the compounds employed and the properties desired. Generally, from about five percent to about seventy percent of monomer, based on weight of polyester, is preferred.

It is understood that to form an interpolymerizable mixture from polyester monomers, it is usually preferable to employ the polyester relatively hot, e.g., at a temperature within the range of about seventy-five to one hundred and fifty degrees centigrade. To effect the mixture of the components at such temperatures, without danger of gelation, as well as for purposes of obviating gelation during subsequent storage of the mixture, it is usually desirable to incorporate into the polyester a suitable gelation inhibitor, for example hydroquinone, chloranil, picric acid and other suitable compounds known to the art. The amount of inhibitor used will vary from 0.005 to 0.015 percent by weight of the plastic composition.

The normal polymerization initiators which may be employed in the present invention are the peroxide catalysts, such as tertiary butyl peroxide, methyl ethyl ketone peroxide, cumene hydroperoxide, benzoyl peroxide and so forth. The amount of initiator used will vary from 0.1 to about 5 percent by weight of the plastic composition.

An accelerator is usually desirable to increase the speed of gelation. Suitable accelerators include metallic dryers such as lead, cobalt, manganese, vanadium and iron in the form of salts such as octoates, naphthenates, gallates, tallates and so forth, amines such as N,N-dimethyl aniline, mercaptans such as dodecyl mercaptan and so forth. The amount of accelerator used will vary from 0.1 to about 1 percent by weight of the plastic composition.

Various unsaturated liquid polyester resins which are flowable at ambient temperatures may be employed in the intermediate layer composition. Generally, the polyester resins free of chlorine are preferred because they are more light stable.

A hydrocarbon wax is generally employed in the intermediate layer composition to prevent atmospheric oxygen from retarding surface curing of the coating. The hydrocarbon waxes migrate to the surface of the coating, thus providing thin layers that exclude oxygen until all the films have hardened. When so protected from the retarding effects of oxygen, the coating compositions have cold curing characteristics, i.e., they will cure within a relatively short period of time without application of heat from an external source. A wide variety of hydrocarbon waxes may be employed for this purpose. The preferred hydrocarbon waxes are paraffin, montan, ozocerite, ceresin, and mixtures thereof. Other materials may be employed such as beeswax, carnauba, sugar cane wax, polyethylene wax and the like. The proportion of hydrocarbon wax employed will vary depending on the solubility of the wax in the entire coating composition, however, from 0.02 to about 0.5 percent by weight of the plastic composition is suitable.

A minor but important component of the intermediate layer is the ultraviolet light stabilizer. The preferred ultraviolet light stabilizers are those of the 2-hydroxybenzophenone series. Illustrative of these are 2,4-dihydroxyphenone; 2,2',4 - trihydroxy - 4' - methoxybenzophenone; 2,2'-dihydroxy-4,4'-dimethoxybenzophenone; 2,2', 4,4' - tetrahydroxybenzophenone; 2 - hydroxy - 5 - chlorobenzophenone; 2 - hydroxy - 2,5' - dichlorobenzophenone; 2-hydroxy-5-methyl-2'-chlorobenzophenone; 2 - hydroxy-5,3',4'-trichlorobenzophenone; 2'-hydroxy-5-methylbenzophenone, 2-hydroxy-2'-chlorobenzophenone; 2-hydroxy-5-5-chlorobenzophenone-2'-carboxylic acid; 2-hydroxy-4-methoxybenzophenone; 2-hydroxy-4,4' - dimethoxybenzophenone; 2-hydroxy-4-chlorobenzophenone and the like. Other ultraviolet light stabilizers that may be employed are salicylates, substituted benzotriazoles, dibenzoylresorcinol and the like. The proportion of light stabilizer may vary from 0.01 to 20 percent based on the weight of the total intermediate layer composition, but from 0.5 to 5 percent is generally preferred.

The balance of the intermediate layer components is preferably the same as the core material enumerated above.

The intermediate layer composition thus prepared is spread upon a polyvinylfluoride film with the desired thickness. This polyvinyl fluoride film may be of any thickness, 0.5 to 4.0 mil (inch) film being suitable. Another advantage of this invention that the polyvinylfluoride film may be of various colors, it not being necessary to employ a particular color (e.g., green) so as to minimize the deleterious effects of ultraviolet light rays. After the intermediate layer composition has gelled, the intermediate layer composition and film are placed upon the polymerizable core mixture. The resulting stratified or laminated plastic article thus obtained is then heated at an elevated temperature, thereby simultaneously obtaining chemical combination of the intermediate layer composition and the core copolymerizable composition and the outer surface polyvinylfluoride film. This may be done by suitable methods known to the art, for example, by placing the coated composition in a heated forced draft oven. The temperature of cure will vary depending upon time and cure required for the ingredients employed. Generally speaking however, a temperature from about 50 to 175 degrees centigrade may be employed, a preferred range being from about 70 to 120 degrees centigrade. Similarly, the time of cure will vary from 1 to about 90 minutes depending upon the cure required, temperature of the cure and ingredients employed. The laminated plastic article thus obtained is extremely light stable, the coating is transparent and extremely adherent, and possesses substantially improved weathering properties, as manifested by longer gloss retention and less exposure of fibrous reinforcing agents on weathering.

Various modifications of the plastic products disclosed will be apparent to those skilled in the art. The invention is illustrated by the following non-limiting examples. Temperatures are expressed in degrees centigrade and parts are by weight unless otherwise indicated.

POLYESTER A

An unsaturated polyester resin was prepared by esterifying 188 parts of ethylene glycol and 46 parts of diethylene glycol with 163 parts of fumaric acid and 800 parts of 1,4,5,6,7,7-hexachlorobicyclo-(2.2.1)-5 - heptene-2,3-dicarboxylic anhydride (which was prepared by the Diels-Alder reaction of hexachlorocyclopentadiene with maleic anhydride). 36 parts of styrene and 100 parts of the product produced by the esterification reaction were mixed together until complete solution was obtained to give a clear, substantially colorless solution of liquid polyester resin having a viscosity of about 2300 centipoises (as measured on a Brookfield viscometer), at 25 degrees centigrade.

POLYESTER B

An unsaturated polyester resin was prepared by esterifying 11 parts of ethylene glycol and 3 parts of diethylene glycol with 10 parts of fumaric acid and 48 parts of 1,4,5,6,7,7 - hexachlorobicyclo - (2.2.1) - 5 - heptene-2,3-dicarboxylic anhydride. To 64 parts of this esterification product was added 28 parts of styrene. The combination was mixed together until complete solution was obtained to give a clear substantially colorless liquid polyester resin. To the resultant mixture was added with blending about 1 part of 2-hydroxy-4-methoxybenzophenone. This resin had a viscosity of 1000 centipoises (Brookfield) at 25 degrees centigrade.

POLYESTER C

An unsaturated polyester resin was prepared by esterifying 28 parts of 1,3-butylene glycol with 22 parts of phthalic acid and 17 parts of fumaric acid. To 67 parts of the resulting polyester were added about 29 parts of styrene. This mixture was then blended until uniform. To about 87 parts of the above polyester styrene blend were added about 2 parts of 2,2-dihydroxy-4,4-dimethoxybenzophenone, about 10 parts of styrene and about 1 part of white ceresin wax, with agitation, until the resulting mixture was a uniform and substantially clear colorless solution.

Fiberglass reinforced plastic laminates were prepared in accordance with the aforementioned methods using Polyesters A, B and C above.

*Example 1*

To 1000 parts of the liquid polyester composition of Polyester C was added 0.7 part of N,N'-dimethylaniline, 1.7 parts of cobalt octoate (12 percent cobalt) and 30.0 parts of methyl ethyl ketone peroxide catalyst. This mixture was spread on (colorless) polyvinyl fluoride film, about 1½ mils thick and allowed to gel. The gelled coated film was approximately 2 mils thick. After one hour at room temperature, a laminate was prepared on the gel coated film by saturating a fiberglass mat with an equal amount by weight of Polyester A (containing 1 percent benzoyl peroxide as a polymerization catalyst). This laminate was cured (for 10 minutes at 80 degrees centigrade followed by 10 minutes at 120 degrees centigrade) on an open bed hydraulic press and thereafter was post cured for ten minutes at 150 degrees centigrade in an oven (forced draft).

*Example 2*

A plastic laminate was prepared with the same materials and by the same procedure of Example 1 except that the polyvinyl fluoride film contained sufficient green dye to permanently color the film.

*Example 3 (control)*

A polyester fiberglass panel was prepared by saturating a fiberglass mat with an equal amount by weight of Polyester B to which had been added 1 percent benzoyl peroxide as polymerization catalyst. This panel was cured as in Example 1.

*Example 4 (control)*

A polyester fiberglass panel similar to that of Example 3 was prepared except that Polyester A was used.

*Example 5 (control)*

A polyester fiberglass panel was prepared by saturating a fiberglass mat with an equal amount by weight of Polyester A. Thereafter a thin layer (approx .5 mil) of 100 parts of unsaturated Polyester C to which had been added 0.7 part N,N'-dimethylaniline, 0.2 part cobalt octoate (12%) and 3.0 parts methyl ethyl ketone peroxide was applied to the surface of the fiberglass panel. The resulting panel was cured in the same manner as Example 1.

*Example 6 (control)*

A fiberglass laminate was prepared by placing a 1½ mils film of polyvinylfluoride (green) on top of a fiberglass mat saturated with unsaturated liquid Polyester A (containing 1 percent benzoyl peroxide as a polymerization catalyst). This laminate was then cured according to the method of Example 1.

The plastic laminates of Examples 1 through 6 were evaluated for ultraviolet light and weather resistance by outdoor exposure in warm dry atmospheres. To accelerate the test the samples were mounted in an equatorial mounting with mirrors so that the natural ultraviolet light could be concentrated onto the small areas of the test panels, and a water spraying machine was utilized. The testing device is described in U.S. Patent 2,945,417. These samples were tested outdoors for twelve weeks and the results are tabulated in the table below. The rating scale is as follows: 10, perfect; 8, good; 6, intermediate; 4, poor; 2, bad, and 0 being considered poorest possible and a failure. Each sample was evaluated for color changes, the amount of fiberglass exposure and amount of surface gloss retention.

TABLE

| Sample | Color | Fiber Exposure | Gloss |
|---|---|---|---|
| Ex. 1 | 8 | 9 | 9 |
| Ex. 2 | 8 | 10 | 9 |
| Ex. 3 (dark yellow) | 4 | 4 | 0 |
| Ex. 4 (brown) | 2 | 2 | 0 |
| Ex. 5 (brown) | 2 | 4 | 0 |
| Ex. 6 (dark yellow) | 4 | 7 | 10 |

The plastic articles of Examples 1 and 2 show superior weathering properties in respect to gloss, fiber exposure and color as compared with the plastic articles prepared in Examples 3–6.

Various changes and modifications may be made in the method of this invention and in the composition ratios of this invention, certain preferred forms which have been described, an equivalence may be substituted but not departing from the spirit and scope of this invention. These modifications are to be regarded as within the scope of this invention.

What is claimed is:

1. A plastic article comprising (a) a copolymerized core material comprised of an unsaturated polyester resin and a vinylidine monomer, (b) an outer surface of polyvinyl fluoride, and (c) a copolymerized intermediate layer comprised of a major proportion of an unsaturated polyester resin and a vinylidine monomer and a minor proportion of an ultraviolet light stabilizer, said intermediate layer being between and permanently bound to said core and said outer surface.

2. A plastic article according to claim 1 wherein the ultraviolet light stabilizer is a 2-hydroxybenzophenone.

3. A plastic article according to claim 1 wherein the core material is comprised of a halogen containing unsaturated resinous reaction product of a polybasic acid and a polyhydric alcohol, wherein said polybasic acid is a Diels-Alder adduct of hexachlorocyclopentadiene, and a vinylidine monomer.

4. A plastic article according to claim 3 wherein the Diels-Alder adduct is 1,4,5,6,7,7 - hexachlorobicyclo-(2.2.1)-5-heptene-2,3-dicarboxylic acid.

5. A plastic article according to claim 1 wherein the intermediate layer is thin relative to the thickness of the core material.

6. A plastic article according to claim 1 wherein the vinylidine monomer of the core material and of the intermediate layer is styrene.

7. A laminated plastic article according to claim 1 wherein the core material is comprised of an unsaturated polyester resin and a vinylidine monomer in combination with a fibrous reinforcing member.

References Cited

UNITED STATES PATENTS

| | | | |
|---|---|---|---|
| 2,580,050 | 12/1951 | Sparks et al. | 161—254 X |
| 2,863,794 | 12/1958 | Robitschek et al. | 156—332 |
| 2,863,795 | 12/1958 | Robitschek et al. | 161—189 X |
| 3,257,266 | 6/1966 | Sapper | 161—189 X |
| 3,265,556 | 8/1966 | Hungerford et al. | 161—189 |

EARL M. BERGERT, *Primary Examiner.*

HAROLD ANSHER, *Examiner.*